US009112283B2

(12) United States Patent
Shoemaker (10) Patent No.: US 9,112,283 B2
(45) Date of Patent: Aug. 18, 2015

(54) MULTI-CHANNEL CABLING FOR RF SIGNAL DISTRIBUTION

(75) Inventor: Curtis L. Shoemaker, Round Rock, TX (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 379 days.

(21) Appl. No.: 13/805,174

(22) PCT Filed: Jun. 1, 2011

(86) PCT No.: PCT/US2011/038664
§ 371 (c)(1),
(2), (4) Date: Dec. 18, 2012

(87) PCT Pub. No.: WO2011/162917
PCT Pub. Date: Dec. 29, 2011

(65) Prior Publication Data
US 2013/0093638 A1  Apr. 18, 2013

Related U.S. Application Data

(60) Provisional application No. 61/357,793, filed on Jun. 23, 2010.

(51) Int. Cl.
*H01Q 13/10*  (2006.01)
*H01Q 13/20*  (2006.01)
*H01Q 1/00*  (2006.01)
*G02B 6/44*  (2006.01)

(52) U.S. Cl.
CPC .............. *H01Q 13/203* (2013.01); *H01Q 1/007* (2013.01); *G02B 6/4416* (2013.01)

(58) Field of Classification Search
CPC ....................................................... H01Q 13/10
USPC ................ 343/770; 174/74, 93; 138/116, 124
See application file for complete search history.

(56) References Cited

U.S. PATENT DOCUMENTS

| 4,091,367 A | 5/1978 | Harman | |
|---|---|---|---|
| 6,304,698 B1 * | 10/2001 | Morris | ........................... 385/100 |
| 6,571,833 B1 * | 6/2003 | McLarty et al. | ............... 138/116 |

(Continued)

FOREIGN PATENT DOCUMENTS

| CN | 200947365 Y | 9/2007 |
|---|---|---|
| CN | 200972807 Y | 11/2007 |

(Continued)

OTHER PUBLICATIONS

Supplementary European Search Report, mailed on Jul. 9, 2014, 3 pp.

(Continued)

*Primary Examiner* — Huedung Mancuso
(74) *Attorney, Agent, or Firm* — Gregg H. Rosenblatt (57) ABSTRACT

A multi-channel RF signal cable comprises a metallic material joining a plurality of radio frequency (RF) signal channels in a generally planar structure, wherein at least a first channel is configured to radiatively send and/or receive a first RF signal from the first channel. The multi-channel RF signal cable can have multiple outbound channels, a dedicated receive channel, and in-field programmable radiators, to provide for flexible network design and optimization in a given indoor radiative environment, for example, in-building wireless applications.

15 Claims, 6 Drawing Sheets

(56) References Cited

U.S. PATENT DOCUMENTS

| | | | |
|---|---|---|---|
| 6,963,031 B2* | 11/2005 | Gladfelter et al. | 174/74 A |
| 7,639,982 B2 | 12/2009 | Wala | |
| 8,581,775 B2* | 11/2013 | Williams | 342/62 |
| 2003/0130013 A1* | 7/2003 | Kaegebein | 455/562 |
| 2007/0063914 A1 | 3/2007 | Becker | |

FOREIGN PATENT DOCUMENTS

| | | |
|---|---|---|
| CN | 10139378 A | 3/2009 |
| CN | 10154260 A | 9/2009 |
| CN | 201327735 Y | 10/2009 |
| CN | 201508712 U | 6/2010 |
| DE | 44 29 022 A1 | 2/1996 |
| EP | 0 492 958 A2 | 7/1992 |
| EP | 0 630 070 A1 | 12/1994 |
| FR | 1304739 | 8/1962 |
| JP | H09-026533 A | 1/1997 |
| JP | 2000-021248 | 1/2000 |
| JP | 2005-190896 | 7/2005 |
| JP | 2007-280843 A | 10/2007 |
| KR | 20-0244169 Y1 | 10/2001 |
| KR | 20-0291246 Y1 | 10/2002 |
| WO | WO 01/22142 | 3/2001 |
| WO | WO 2010/148165 | 12/2010 |

OTHER PUBLICATIONS

Product Page, "RADIAFLEX® Radiating Cable", Radio Frequency Systems, Meriden, Connecticut, Usa [online - retrieved from the internet Dec. 17, 2012]; URL <http://www.rfsworld.com/RADIAFLEX-Radiating-Cable,209,1.html>.

Chinese Search Report, mailed on Jul. 3, 2014, 2 pp.

* cited by examiner

MULTI-CHANNEL CABLING FOR RF SIGNAL DISTRIBUTION

BACKGROUND OF THE INVENTION

1. Field of the Invention

The present invention is directed to multi-channel cabling for distributing radio frequency (RF) signals. In particular, the present invention is directed to laminated multi-channel coaxial (coax) cabling for distributing radio frequency (RF) signals within a structure or building.

2. Background

The continuing expansion of wireless communication and its accompanying wireless technology will require many more "cell sites" than are currently deployed. This expansion has been estimated from a doubling to a ten-fold increase in the current number of cell sites, particularly in the deployment of 4G/LTE (long term evolution) networks. This dramatic increase in the number of cell sites is due, at least in part, to the high bandwidth demand for wireless applications, where the bandwidth of a given cell site must be shared with all available UE (user equipment) within range of the site.

Better wireless communication coverage is needed to provide the desired bandwidth to an increasing number of customers. Thus, in addition to new deployments of traditional, large "macro" cell sites, there is a need to expand the number of "micro" cell sites (sites within structures, such as office buildings, schools, hospitals, and residential units). In-Building Wireless (IBW) Distributed Antenna Systems (DASs) are utilized to improve wireless coverage within buildings and related structures. Conventional DASs use strategically placed antennas or leaky coaxial cable (leaky coax) throughout a building to accommodate radio frequency (RF) signals in the 300 MHz to 6 GHz frequency range. Conventional RF technologies include TDMA, CDMA, WCDMA, GSM, UMTS, PCS/cellular, iDEN, WiFi, and many others.

Outside the United States, carriers are required by law in some countries to extend wireless coverage inside buildings. In the United States, bandwidth demands and safety concerns will drive IBW applications, particularly as the world moves to current 4G architectures and beyond.

There are a number of known network architectures for distributing wireless communications inside a building. These architectures include choices of passive, active and hybrid systems. Active architectures generally include manipulated RF signals carried over fiber optic cables to remote electronic devices which reconstitute the electrical signal and transmit/receive the signal. Passive architectures include components to radiate and receive signals, usually through a punctured shield leaky coax network. Hybrid architectures include native RF signal carried optically to active signal distribution points which then feed multiple coaxial cables terminating in multiple transmit/receive antennas. Specific examples include analog/amplified RF, RoF (Radio over Fiber, also known as RFoG, or RF over glass), fiber backhaul to pico and femto cells, and RoF vertical or riser distribution with an extensive passive coaxial distribution from a remote unit to the rest of the horizontal cabling (within a floor, for example). These conventional architectures can have limitations in terms of electronic complexity and expense, inability to easily add services, inability to support all combinations of services, distance limitations, or cumbersome installation requirements.

Conventional cabling for IBW applications includes RADIAFLEX™ cabling available from RFS (www.rfs-world.com), standard ½ inch coax for horizontal cabling, ⅞ inch coax for riser cabling, as well as, standard optical fiber cabling for riser and horizontal distribution.

Physical and aesthetic challenges exist in providing IBW cabling for different wireless network architectures, especially in older buildings and structures. These challenges include gaining building access, limited distribution space in riser closets, and space for cable routing and management.

SUMMARY

According to an exemplary aspect of the present invention, a multi-channel RF signal cable comprises a metallic material joining a plurality of radio frequency (RF) signal channels in a generally planar structure, wherein at least a first channel is configured to radiatively send and/or receive a first RF signal from the first channel.

In one aspect, each of the RF signal channels comprises a coaxial cable construction. In another aspect, at least one of the RF signal channels comprises one or more optical fibers. In another aspect, a second channel is configured to radiatively send and/or receive a second RF signal from the second channel. In another aspect, a third, non-radiating channel is disposed between the first channel and the second channel.

In another aspect, the first channel comprises a plurality of radiating apertures formed longitudinally along the axial length of the first channel. In another aspect, the plurality of radiating apertures are formed along the axial length of the first channel in a random pattern. In another aspect, a portion of the radiating apertures are covered by a metallic tape. In another aspect, the second channel is a dedicated receive channel.

In another aspect, the multi-channel RF signal cable is formed in a lamination process.

In another aspect, the radiating apertures are covered by a layer of low dielectric material. In another aspect, the layer of low dielectric material has a thickness of 2 mils or less. In another aspect, exposed dielectric in the radiating apertures is covered by a hydrophobic coating.

In another aspect, the first channel includes a longitudinal slot formed in the metallic material along the axial length of the first channel. In another aspect, the longitudinal slot has an opening from about 20 degrees to about 55 degrees.

According to another exemplary aspect of the present invention, a multi-channel horizontal cable for in-building wireless communications comprises a plurality of RF signal channels disposed in a generally planar casing; wherein each of the plurality of signal channels provides a separate RF signal pathway and at least one of the plurality of signal channels provides an in-field, programmable RF radiating channel.

In another aspect, a first channel carries an RF signal from a first wireless service provider and a second channel carries an RF signal from a second wireless service provider.

In another aspect, at least one of the RF signal channels comprises a coaxial cable construction. In another aspect, at least one of the RF signal channels comprises an optical fiber. In another aspect, at least two of the plurality of signal channels provide in-field, programmable RF radiating channels.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to multi-channel cabling that can be utilized for in-building wireless (IBW) applications to provide multi-channel radio frequency (RF) signal distribution. In particular, the inventive cabling provides for multiple channels of cellular traffic (or WiFi signals) to be distributed. These channels can be dedicated to different carriers, each needing wireless distribution in a building, or to providing different services. These channels can also be dedicated to routing signals to different locations within a building. The cabling also provides the option of one or more radiating channels for radiating the RF/cellular signal without the use of separate antennas. The cabling structure allows for custom designed or programmable radiation areas from the cable at certain locations along the cabling, where RF signal level can be preserved in other portions of the cable. The cabling can also provide a separate "receive" channel (or "reverse link" in cellular parlance). The cabling can further provide for straightforward installation of "inter-digitated" lines of radiating coax to illuminate or cover an extended area or room. Thus, the multi-channel cable, with its multiple outbound channels, dedicated receive channel, and in-field programmable radiators, provides for flexible network design and optimization in a given indoor radiative environment.

Figure 1A:
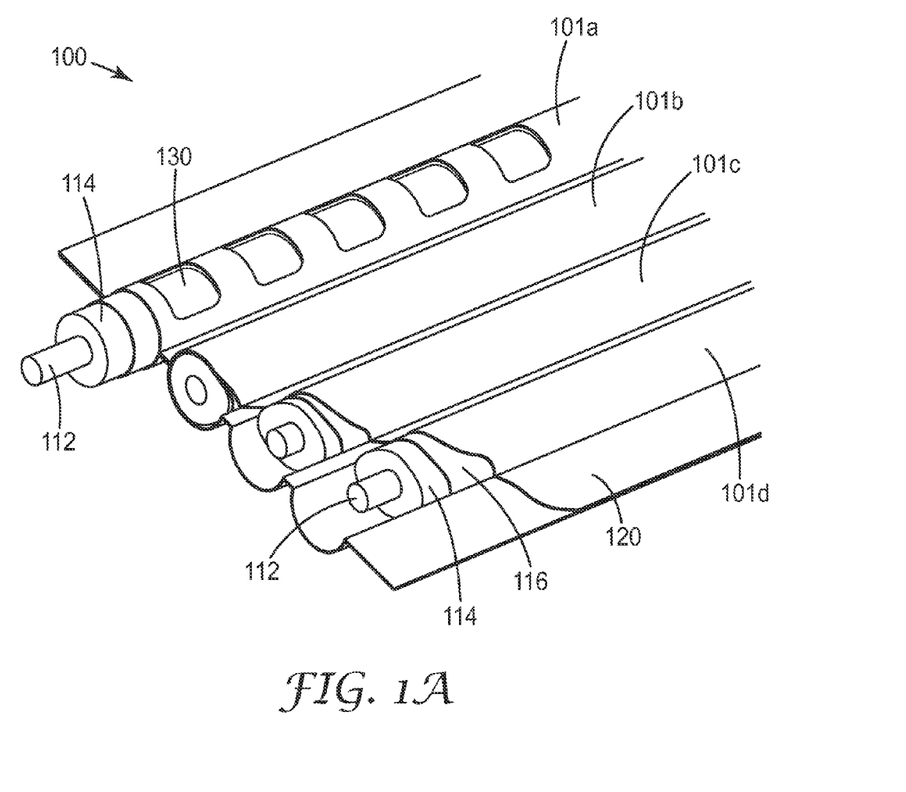
FIG. 1A is an isometric section view of a laminated multi-channel (LMC) cable according to a first aspect of the invention.

FIG. 1A shows a first aspect of the present invention, a multi-channel cable 100. In this exemplary aspect, cable 100 is a laminated structure and is referred to herein as a laminated multi-channel ("LMC") cable. This description is not meant to be limiting in the sense that processes other than lamination may be used to form the exemplary multi-channel cables described herein.

LMC cable 100 includes multiple channels 101a-101d, each including a communications line. Of course, as will be apparent to one of ordinary skill in the art given the present description, LMC cable 100 can include a fewer or greater number of communication line channels (e.g., two channels, three channels, five channels, six channels, etc.).

In one aspect, each of the channels comprises a coaxial cable, having a center conductor 112 surrounded by a dielectric material 114 that is surrounded by an outer conductor shield 116. The center conductor 112 can be a conventional metal wire such as copper. In some applications, such as for microwave coax applications, the center conductor 112 can comprise an aluminum wire with copper plating. The dielectric material 114 can be a conventional dielectric material such as a foam dielectric that entrains a substantial amount of air to provide a low loss dielectric. The outer conductor shield 116 is a conventional metal (foil) or metal foil in combination with a vacuum deposited metal on the dielectric material. Such a waveguide structure can provide low skin effect losses and good RF ground. In a preferred aspect, coax cable channels are configured to provide for transmission of radio frequency (RF) signals, having a transmission frequency range of from about 400 MHz to about 6 GHz.

In accordance with the present invention, a metallic secondary outer sheath 120 can be laminated over each of the channels 101a-101d to provide a single cable assembly structure. In this example, the metallic secondary outer sheath 120 is laminated directly over conductor shields 116 for each of the channels 101a-101d. The metallic secondary outer sheath 120 can be formed from a metal, such as copper or aluminum, having a thickness of about 0.001" to about 0.015".

Outer sheath 120 can be laminated onto the signal channels using a lamination process, such as a roll-to-roll process, where two outer sheath layers 120 are bonded onto the signal channels. Bonding can be accomplished using a thermoplastic liner, a hot-melt in selective locations, or another conventional process. In one aspect, a lamination process such as is described in U.S. patent application Ser. No. 61/218,739, incorporated by reference herein in its entirety, can be utilized.

The metallic outer sheath 120 is fire retardant and can provide for heat dissipation. Moreover, the outer sheath 120 can provide a common RF ground for the multiple channels disposed therein. The metallic outer sheath 120 also provides for mechanical stability during installation. Although this exemplary embodiment describes a lamination process as forming LMC cable 100, the multi-channel RF signal cabling can also be constructed using alternative processes, such as resistance welding the top and bottom outer metallic layers between the signal channels and/or along the periphery.

Figure 2A:
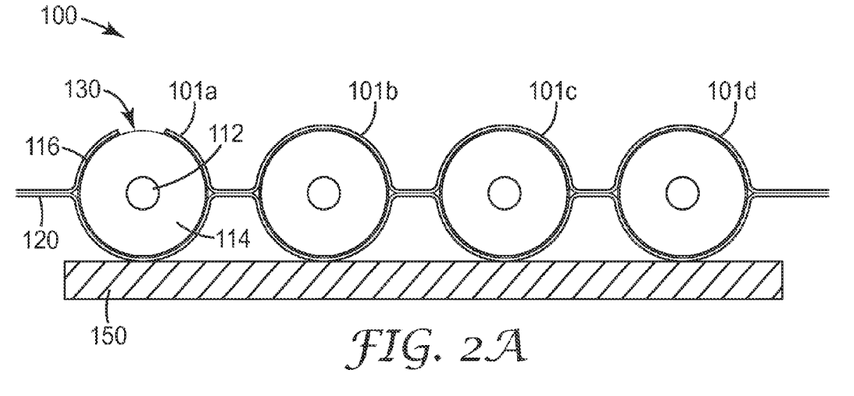
FIG. 2A is a cross section view of the LMC cable of FIG. 1A.

Cable 100 can have a low profile, generally flat construction and can be used for a variety of IBW horizontal cabling applications. For example, as shown in cross section view in FIG. 2A, outer sheath 120 is laminated onto each of the coax channels 101a-101d such that the conductor shields 116 for each channel are not in direct contact. In addition, an adhesive backing layer 150 can be provided on one side of cable 100 to help mount LMC cable 100 to a standard mounting surface (such as a wall). The adhesive backing layer 150 comprises an adhesive, such as an acrylic, pressure sensitive adhesive or double-sided tape, disposed on all or at least part of surface the rear surface of LMC cable 100. In one aspect, adhesive backing layer 150 comprises a factory applied 3M VHB 4941F adhesive tape (available from 3M Company, St. Paul Minn.). In another aspect, adhesive backing layer 150 comprises a removable adhesive, such as a stretch release adhesive.

Alternatively, the adhesive backing layer may be removed and the extended metallic flange may be directly stapled to any interior surface capable of receiving a staple. Other surfaces may use traditional anchors through the flange of the material.

Figure 2B:
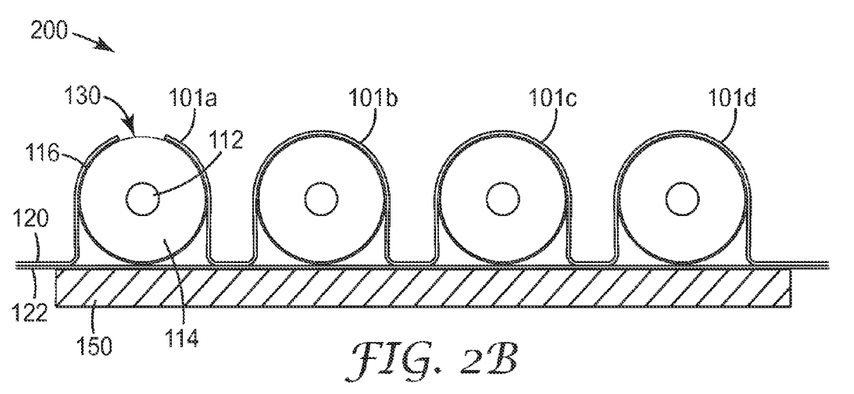
FIG. 2B is a cross section view of an alternative LMC cable according to another aspect of the invention.

In another alternative aspect, as shown in cross section view in FIG. 2B, an alternative multi-channel cable, here LMC cable 200 is shown, where the top layer of outer sheath 120 is laminated onto each of the coax channels 101a-101d and the lower sheath layer provides a flat rear surface 122. An adhesive backing layer 150 can also be provided on at least a portion of surface 122.

Figure 2C:
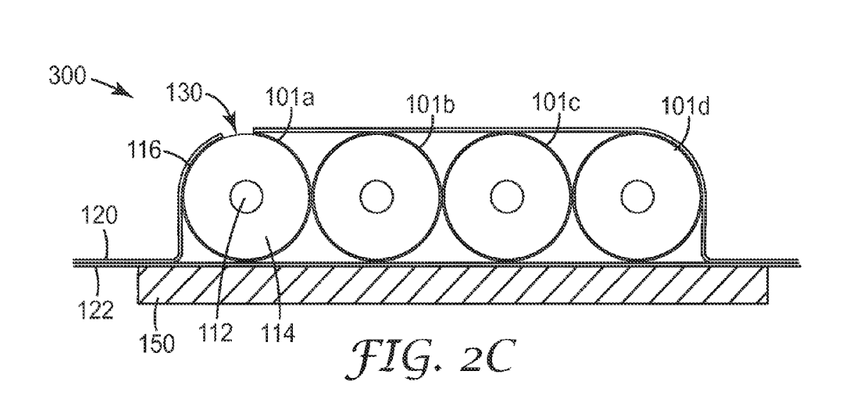
FIG. 2C is a cross section view of an alternative LMC cable according to another aspect of the invention.

In a further alternative, as shown in cross section view in FIG. 2C, an alternative LMC cable 300 is shown, where the outer sheath 120 is laminated onto each of the coax channels 101a-101d, which are compressed together such that each channel is touching a neighboring channel and such that the LMC cable 300 also has a flat rear surface 122. An adhesive backing layer 150 can also be provided on at least a portion of surface 122. In a further alternative aspect, for LMC cables 200 and 300, each channel 101a-101d can be formed without a conductor shield 116.

In a further alternative, the adhesive backing layer is optional.

Optionally, LMC cable 100 can further include a very thin (e.g., up to 2 mils thickness) outer skin formed from a low dielectric material to cover the entire outer perimeter of cable 100. This low dielectric material outer skin can prevent moisture from penetrating the foamed dielectric in each coax channel where radiating apertures have been made in the outer shield. The low dielectric material outer skin can also be used as a decorative cover. Alternatively, in areas in which radiating structures are created with apertures in the outer metallic shield, an exemplary sealing material comprises a Novec fluid, such as EGC-1700 or EGC-2702, which provides a hydrophobic coating to seal radiating apertures.

Referring back to FIG. 1A, in one aspect, first channel 101a is a dedicated radiating channel which radiates a cellular communications signal via an arrangement of one or more radiating apertures 130 that are cut through the secondary outer sheath 120 and the outer conductor shield 116 over first channel 101a. The slots can comprise a repeating periodic structure of apertures 130 formed to have a specific axial length and transverse width and axially spaced down the length of first channel 101a. When such apertures have a regular spacing and size, the impedance mismatch between open areas and covered areas can produce a tuning effect. In an alternative aspect, as provided in more detail below, apertures 130 can be provided in a non-periodic, or even random, configuration along the length of the first channel 101a. In one aspect, channel 101a can operate as a radiating (send) and receive channel. In other aspects, first channel 101a operates as a send channel only. In other aspects, first channel 101a operates as a receive channel only.

Figure 3:
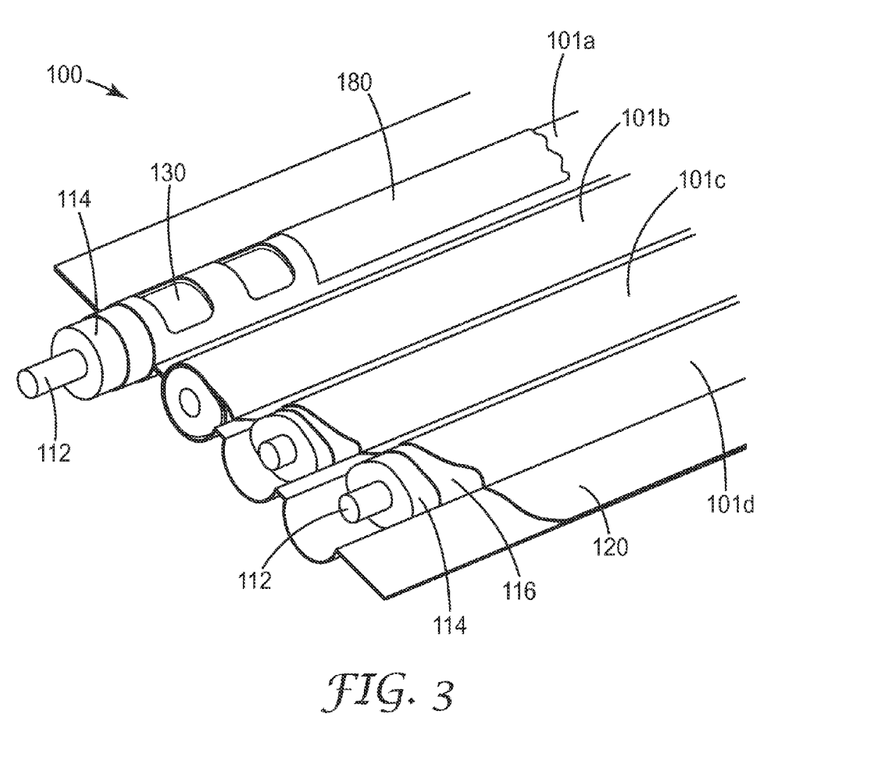
FIG. 3 is an isometric view of an alternative LMC cable according to another aspect of the invention.

Unlike traditional leaky coax, first channel 101a can be custom designed so that radiating portions of the first channel are limited to selected areas. For example, the incorporation of metallic tape over some of the radiating apertures 130 allows for preserving the signal level between the head end and the place where the signal is to be radiated. As shown in FIG. 3, metallic tape 180 can be placed over a portion of first channel 101a. Metallic tape 180 can be a copper foil with a very thin layer of adhesive (for maximizing the capacitive coupling to the outer metallic layer) and optionally a decorative outer layer for aesthetic purposes, typically matching the appearance of the outer metallic layer. The installer can route LMC cable 100 through a structure and remove the factory laminated removable foil tape in areas where RF transmission into the room or area is desired. The incorporation of metallic tape allows for in-field programmable radiation location to be established, as needed for the particular installation. In addition, the selective use of the metallic tape allows for the use of smaller coax, with easier installation but higher intrinsic loss, as the radiation loss is reduced in areas where radiated signal is not needed.

In an example manufacturing process, the LMC cable may enter an in-line punch station to punch radiating apertures in a given coax channel. This process may be under computer control to allow for the custom manufacture of cables per given network design. The punched conductor shield/sheath can then be laminated into the cable structure. A copper or aluminum adhesive strip may be placed over the apertures creating a shield that may later be removed to provide in-field programmable radiation pattern.

In another aspect, a post formation process may be utilized to remove any remaining outer foil layer from the foam dielectric core. This process may be a high speed step and repeat process, using, for example a 2 flute end mill running on a high speed air bearing spindle. The post process can remove as much foam outer dielectric as needed to clear away the inner foil metallic shield. Alternatively, a post formation process may entail laser ablation of the metallic foil from inside the punched area of the foil.

Alternatively, if a plunge cut milling process is used for post formation processing, then a small "crater" may be formed in the foam dielectric. This crater can be filled with a very low dielectric material to improve impedance match to air for the radiating aperture. The filler material can have a relative permittivity intermediate between air (1.0) and the foamed dielectric (usually around 1.4). This filler can include, for example, hollow glass or polymer spheres loaded into a bonding medium, preferably of low dielectric constant and low loss tangent.

As a further alternative, the outer conductor layer 116 of the coaxial cable may be removed over a section of the cable, creating an arc (of about 45 degrees, as an example), creating a continuous slot in this foil, for the radiating aperture only. This section of removed foil can be aligned with the punched slots in the outer sheath 120 of the laminated cable construction, thereby providing radiating structures for this particular RF signal channel in the multi-channel cable.

LMC cable losses can also be reduced by using larger diameter coax cabling. A large diameter coax core can reduce both skin effect and dielectric loss mechanisms.

Referring back to FIG. 1A, LMC cable 100 further includes channels 101b-101d, each comprising a coax construction. In this embodiment, each of channels 101b-101d is configured as a separate RF signal pathway. Thus, channel 101b can provide a signal pathway at a first frequency band, channel 101c can provide a signal pathway at a second frequency band, and channel 101d can provide a signal pathway at a third frequency band. Alternatively, channel 101b can provide a signal pathway for a first service provider, channel 101c can provide a signal pathway for a second service provider, and channel 101d can provide a signal pathway for a third service provider. Alternatively, channel 101b can provide a signal pathway for a first type of service (e.g., GSM), channel 101c can provide a signal pathway for a second type of service (e.g., iDEN), and channel 101d can provide a signal pathway for a third type of service (e.g., UMTS).

One benefit of this type of LMC cable configuration is that by having separated service pathways, the effects of passive inter-modulation (PIM, where services operating at different frequencies interact) can be reduced.

FIG. 1A shows first channel 101a as having radiating apertures 130 spaced at regular intervals. As mentioned above, when the apertures have a regular spacing and size, the impedance mismatch between open areas and foil covered areas can produce a tuning effect. This effect induces some frequency selective tuning, which can be undesirable. In some aspects, the LMC cable configuration can allow for purposeful tuning to be introduced to filter out an unwanted frequency.

Figure 1B:
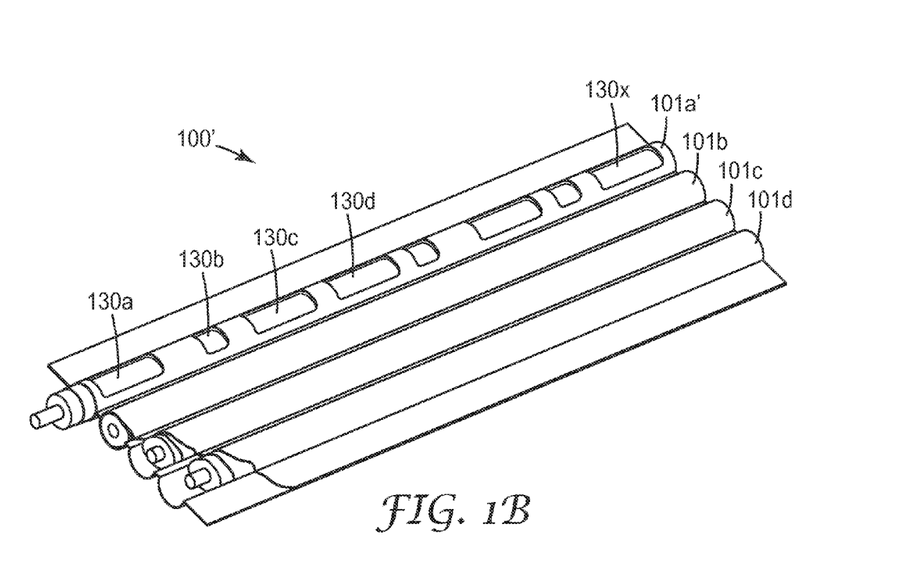
FIGS. 1B-1D are isometric views of alternative LMC cables according to other aspects of the invention.

The LMC cable configuration further provides for ways for reducing or eliminating the tuning effects to provide for broad band performance. In one alternative aspect, radiating apertures are formed via a "random" punching geometry. During formation of the LMC cable, the cable can be passed through a computer controlled in-line punch, in which a pre-selected random sequence (within specified minimum and maximum spacing) is used to drive the computer controlled punch. For example, FIG. 1B shows an alternative LMC cable 100' having a first channel 101a' with a set of radiating apertures 130a-130x randomly spaced along the axial length of the channel. Each of the apertures 130a, 130b, 130c, 130d, etc. can have a different shape (length and width) and each of the apertures can be separated by a different distance along the axial length of the channel 101a'.

As the investigators have determined, an incoherent model for the scattering due to randomly punched slots shows a loss of about 1 dB per 100 ft for a channel having a construction similar to a conventional LMR-400 coax cable, with a 45 degree radiating aperture. This loss would be similar to the induced loss in any punched coax, and is the loss over and above the intrinsic absorption and the radiative loss through the apertures themselves.

Figure 1C:
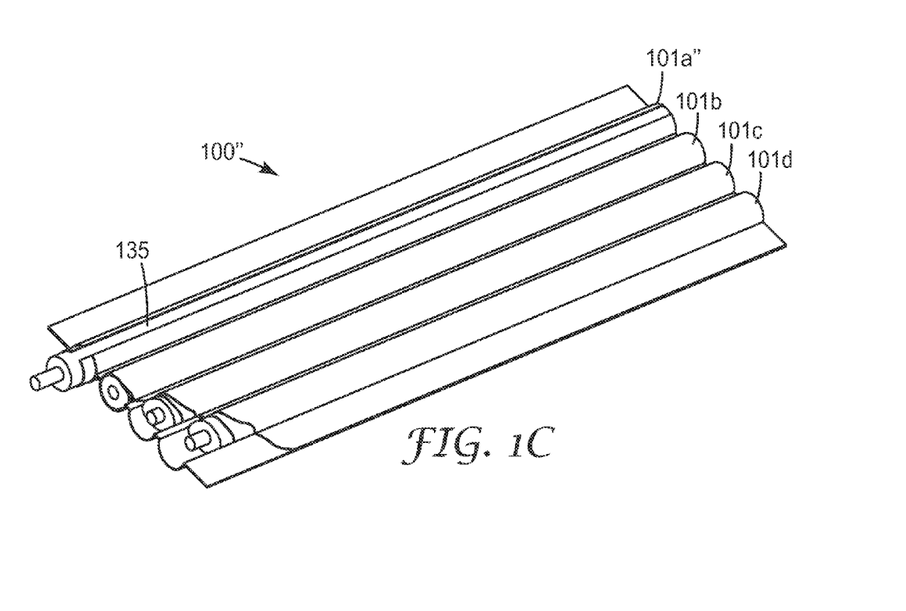

In another alternative aspect, broadband performance can be obtained by including a longitudinal slot in the outer sheath 120. For example, as shown in FIG. 1C, an alternative LMC cable 100" includes a first channel 101a" having a slot 135 formed lengthwise in the outer sheath/conductor shield. Slot 135 has from about a 20 degree to about a 55 degree opening, preferably about a 45 degree opening, along the entire axial length of channel 101a", or at least a substantial portion of the axial length of channel 101a". This configuration changes the impedance of the transmission line (in one example, using a 45 degree slot in a channel having a construction similar to a conventional Times Microwave (Amphenol) LMR-400 coax cable, the impedance increases from 50 to 50.6 ohms). The tradeoff to be considered with this elongated slot 135 is the decrease in mechanical strength. For this alternative embodiment, an outer coating or encasing material, such as the low dielectric material mentioned previously, can be used to gain additional mechanical strength. Alternatively, a low-dielectric film or tape covering over the slot may be utilized, for example.

Figure 1D:
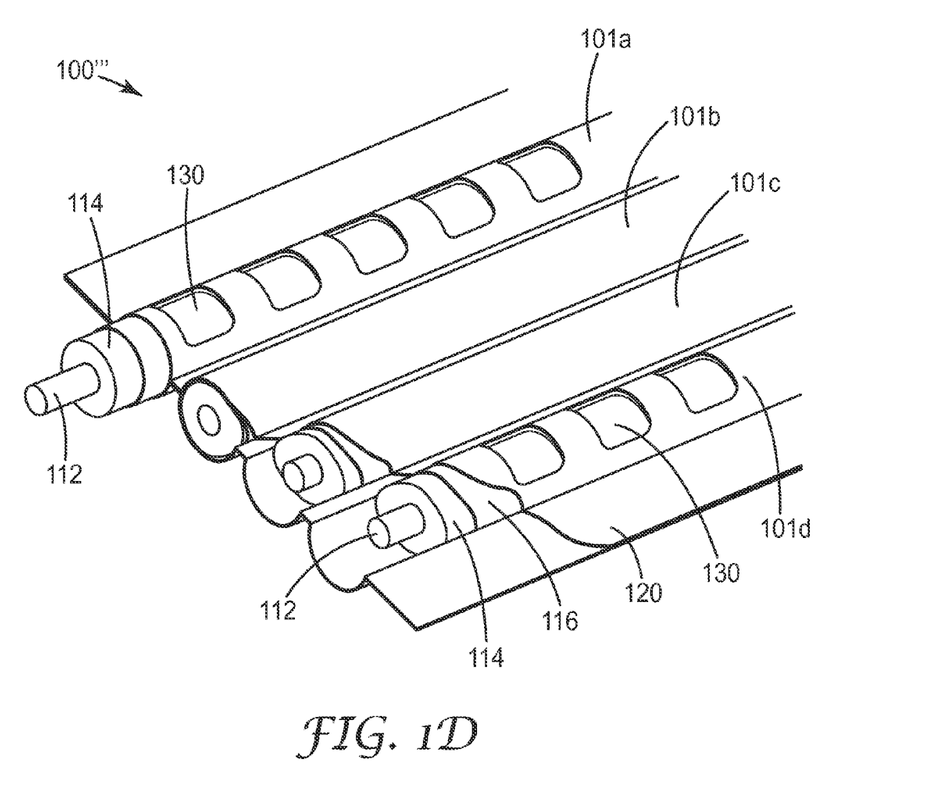

In another aspect, the LMC cable of the present invention can include multiple radiating channels. For example, as shown in FIG. 1D, LMC cable 100''' includes radiating channels 101a and 101d, each having a plurality of radiating apertures 130 formed thereon. The radiating channels 101a and 101d may utilize periodic spaced apertures or randomly spaced apertures. In this configuration, the radiating channels are separated by signal channels 101b and 101c. With this configuration, the separated radiating channels are less likely to induce crosstalk. Alternatively, radiating channels can be adjacent one another—for example, channels 101a and 101b can be radiating channels, or channels 101b and 101c can be radiating channels. In a further alternative, a plurality of radiating channels can each be separated by a non-radiating channel—for example channel 101a and channel 101c can be radiating channels, separated by a non-radiating channel 101b.

In a further alternative, each channel 101a-101d can be constructed such that each outer conductor shield 116 has a longitudinal slotted construction, for example from about a 20 degree to about a 55 degree opening, preferably about a 45 degree opening slot longitudinally formed over channel. The cable can be laminated with a metallic outer sheath to cover the channels where needed for a particular application.

In addition, the radiating channels can each have a different aperture structure, such as the random aperture structure shown in FIG. 1B or the longitudinal slotted structure shown in FIG. 1C.

In the above described embodiments, each of the signal channels has a coax construction. In another alternative aspect of the invention, the LMC cable can have a hybrid construction, where one or more of the signal channels can comprise an optical fiber, or group of optical fibers, such as a single mode optical fiber designed to transport native RF signals.

Figure 4:
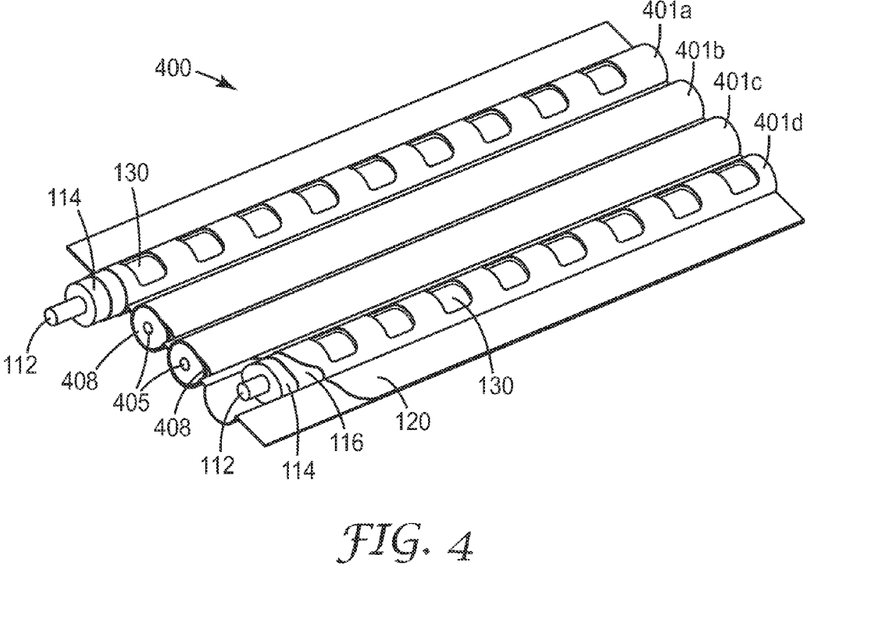
FIG. 4 is an isometric view of an alternative LMC cable according to another aspect of the invention.

For example, as shown in FIG. 4, laminated multi-channel (LMC) cable 400 includes multiple channels 401a-401d, each including a communications line. In this aspect, each of the channels 401a and 401d comprises a coaxial cable, having a center conductor 112 surrounded by a dielectric material 114 that is surrounded by an outer conductor shield 116. Also in this aspect, each of channels 401b and 401c comprises an optical fiber cable, where an optical fiber core/clad structure 405 is surrounded by a jacket 408. The optical fiber channels can be single mode or, alternatively, multi-mode. The optical fiber signal channels can be optimized for carrying RFoG.

In accordance with the present invention, a metallic secondary outer sheath 120 is laminated over each of the channels 401a-401d to provide a single cable assembly structure. In this example, the metallic secondary outer sheath 120 is laminated directly over each of the channels 401a-401d. The metallic secondary outer sheath 120 can be constructed as described above. Outer sheath 120 can be laminated onto the signal channels 401a-401d using a conventional lamination process. In a further alternative, channel 401a can be formed as a coax and channels 401b-401d can be formed as optical fibers. In another alternative, channels 401a and 401b can be formed as coax channels and channels 401c and 401d can be formed as optical fibers.

In another alternative aspect, the LMC cable can further include one or more communication channels configured as CAT5, CAT6 lines.

Other hybrid configurations are also possible, as would be apparent to one of ordinary skill in the art given the present description.

The above multi-channel RF signal cable configurations can be utilized in a variety of IBW applications with a variety of different IBW architectures. For example, the RF signal cabling described herein can be used as part of a passive copper coax distribution architecture. In this architecture, the multiple signal channels can each comprise a coax cable construction. With only a head-end active component, such as BDA (bi-directional amplifiers) or BTS (base-station transceivers), the one or more radiating channels of the RF signal cable obviate the need to implement multiple antennas throughout the building. For example, for installation below a drop ceiling, the generally planar structure of the RF signal cable allows radiating apertures to face downward as the cable lays flat against the drop ceiling support structure.

This system can also be implemented with discrete radiating antennas connected to the horizontal coax channels with conventional splitters, taps, and/or couplers. In this manner, multiple service carriers can utilize the RF signal cable as horizontal cabling or as part of a radiating antenna system, or both. This type of architecture can work with many different RF protocols (e.g., any cellular service, iDEN, Ev-DO, GSM, UMTS, CDMA, and others).

In another example, the RF signal cabling described herein can be used as part of an active analog distribution architecture. In this type of architecture, RF signal distribution can be made over coax or fiber (RoF). In a preferred aspect, the multiple lanes of traffic can be used to create separate forward and reverse links, improving isolation, separate link budgets, and allowing for separate gain with reduced possibility of feedback. In this architecture, the RF signal cabling can be combined with selected active components, where the types of active components (e.g., O/E converters for RoF, MMIC amplifiers) are selected based on the specific architecture type. This type of architecture can provide for longer propagation distances and/or better signal to noise ratios within the building and can work with many different RF protocols (e.g., any cellular service, iDEN, Ev-DO, GSM, UMTS, CDMA, and others).

As described above with respect to the various RF signal cable embodiments, the RF signal cabling of the present invention provides an RF signal distribution medium within a building or other structure that includes multiple channels. Thus, different carriers each needing wireless distribution in a building can utilize the RF signal cabling, where a common horizontal installation can support different carriers, providing cost savings and carrier autonomy. In addition, different services, such as GSM, UMTS, IDEN, Ev-DO, LTE, and others can be distributed by the RF signal cabling. Moreover, with the RF signal cabling configurations discussed above, PIM is reduced or eliminated as separated signal pathways carry the services operating at different frequencies.

The RF signal cabling also provides for routing signals to different locations within a building, such as "lunch room," "conference room," "meeting room", etc. The multiple channel designs also allows for a separate receive channel to be set up independent of the other channels, if needed. This type of configuration can provide for better signal conditioning, as discussed above, for getting the user equipment (UE) signal back to the cell site.

The RF signal cabling can include radiating coax channels that serve as an antenna structure that can be installed on a building wall or in the ceiling in a straightforward manner. The incorporation of metallic tape over selected radiating apertures allows for preserving the signal level between the head end and the area where the signal is to be radiated. The metallic tape further allows for in-field programmable radiation location to be established, as needed for the particular installation. Also, the incorporation of metallic tape over selected radiating apertures allows for relatively small sized coax to be utilized for the multiple signal channels. This smaller product form factor can be much easier to install. Losses can be managed by sending separate signals to areas that are further from the head end, leaving the apertures sealed, using a separate receive coax channel, radiating power only where needed, and using amplifiers on an as-needed basis.

Thus, the RF signal cable described herein, with its multiple outbound channels, dedicated receive channel, and in-field programmable radiators, provides for flexible network design and optimization in a given indoor radiative environment.

While the above embodiments are described in relation to IBW applications, the RF signal cabling of the present invention can also be utilized in outdoor wireless applications as well.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A multi-channel RF signal cable, comprising:
a metallic material joining a plurality of radio frequency (RF) signal channels in a generally planar structure, wherein at least a first channel is configured to radiatively send and/or receive a first RF signal from the first channel, a second channel is configured to radiatively send and/or receive a second RF signal from the second channel, and a third, non-radiating channel is disposed between the first channel and the second channel.

2. The multi-channel RF signal cable of claim 1, wherein each of the RF signal channels comprises a coaxial cable construction.

3. The multi-channel RF signal cable of claim 1, wherein at least one of the RF signal channels comprises one or more optical fibers.

4. The multi-channel RF signal cable of claim 1, wherein the first channel comprises a plurality of radiating apertures formed longitudinally along the axial length of the first channel.

5. The multi-channel RF signal cable of claim 4, wherein the plurality of radiating apertures are formed along the axial length of the first channel in a random pattern.

6. The multi-channel RF signal cable of claim 4, wherein a portion of the radiating apertures are covered by a metallic tape.

7. The multi-channel RF signal cable of claim 1, wherein a second channel is a dedicated receive channel.

8. The multi-channel RF signal cable of claim 1, wherein the multi-channel RF signal cable is formed in a lamination process.

9. The multi-channel RF signal of claim 4, wherein the radiating apertures are covered by a layer of low dielectric material.

10. The multi-channel RF signal cable of claim 9, wherein the layer of low dielectric material has a thickness of 2 mils or less.

11. The multi-channel RF signal cable of claim 4, wherein exposed dielectric in the radiating apertures is covered by a hydrophobic coating.

12. The multi-channel RF signal cable of claim 1, wherein the first channel includes a longitudinal slot formed in the metallic material along the axial length of the first channel.

13. The multi-channel RF signal cable of claim 12, wherein the longitudinal slot has an opening from about 20 degrees to about 55 degrees.

14. A multi-channel RF signal cable, comprising:
a metallic material joining a plurality of radio frequency (RF) signal channels in a generally planar structure, wherein at least a first channel is configured to radiatively send and/or receive a first RF signal from the first channel, and the first channel comprises a plurality of radiating apertures formed longitudinally along the axial length of the first channel.

15. A multi-channel RF signal cable, comprising:
a metallic material joining a plurality of radio frequency (RF) signal channels in a generally planar structure, wherein at least a first channel is configured to radiatively send and/or receive a first RF signal from the first channel, and the first channel includes a longitudinal slot formed in the metallic material along the axial length of the first channel.

* * * * *

UNITED STATES PATENT AND TRADEMARK OFFICE
CERTIFICATE OF CORRECTION

| | | |
|---|---|---|
| PATENT NO. | : 9,112,283 B2 | Page 1 of 1 |
| APPLICATION NO. | : 13/805174 | |
| DATED | : August 18, 2015 | |
| INVENTOR(S) | : Curtis L. Shoemaker | |

It is certified that error appears in the above-identified patent and that said Letters Patent is hereby corrected as shown below:

In the Claims
Column 10,
Line 50, after "signal" insert --cable--.

Signed and Sealed this
Nineteenth Day of April, 2016

Michelle K. Lee
*Director of the United States Patent and Trademark Office*